(12) United States Patent
Chandramouli et al.

(10) Patent No.: US 12,431,998 B2
(45) Date of Patent: Sep. 30, 2025

(54) WORKING CLOCK DETERMINATION FOR A MOBILE USER EQUIPMENT

(71) Applicant: Nokia Technologies Oy, Espoo (FI)

(72) Inventors: Devaki Chandramouli, Plano, TX (US); Dawid Koziol, Wroclaw (PL); Rakash Sivasiva Ganesan, Aschaffenburg (DE); Pilar Andrés Maldonado, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 321 days.

(21) Appl. No.: 18/006,436

(22) PCT Filed: Jul. 15, 2021

(86) PCT No.: PCT/EP2021/069744
§ 371 (c)(1),
(2) Date: Jan. 23, 2023

(87) PCT Pub. No.: WO2022/028844
PCT Pub. Date: Feb. 10, 2022

(65) Prior Publication Data
US 2023/0269016 A1 Aug. 24, 2023

Related U.S. Application Data

(60) Provisional application No. 63/061,502, filed on Aug. 5, 2020.

(51) Int. Cl.
*H04J 3/06* (2006.01)
*H04J 3/12* (2006.01)

(52) U.S. Cl.
CPC .......... *H04J 3/0667* (2013.01); *H04J 3/0641* (2013.01); *H04J 3/12* (2013.01)

(58) Field of Classification Search
CPC .......... H04J 3/0667; H04J 3/0641; H04J 3/12; H04W 76/12
See application file for complete search history.

(56) References Cited

U.S. PATENT DOCUMENTS

| 10,306,580 B1 * | 5/2019 | Gupta .................... H04W 8/02 |
| 10,999,787 B2 * | 5/2021 | Dao ....................... H04W 48/18 |

(Continued)

FOREIGN PATENT DOCUMENTS

| WO | 2011/032494 A1 | 3/2011 |
| WO | 2020/067977 A1 | 4/2020 |

(Continued)

OTHER PUBLICATIONS

"3rd Generation Partnership Project; Technical Specification Group Services and System Aspects; Service requirements for cyber-physical control applications in vertical domains; Stage 1 (Release 17)", 3GPP TS 22.104, V17.2.0, Dec. 2019, pp. 1-76.

(Continued)

*Primary Examiner* — Bailor C Hsu
(74) *Attorney, Agent, or Firm* — Nokia Technologies Oy

(57) ABSTRACT

Systems, methods, apparatuses, and computer program products for working clock determination for a mobile user equipment. A method may include receiving time domain information at a session management function during a protocol data unit (PDU) session procedure. The method may also include forwarding the time domain information to a user plane function for the PDU session procedure. The method may further include configuring the user plane function according to the time domain information to enable determination of a correct mapping between the time domain information and a user equipment or a PDU session.

13 Claims, 9 Drawing Sheets

(56) References Cited

U.S. PATENT DOCUMENTS

| | | | |
|---|---|---|---|
| 11,206,629 B2* | 12/2021 | Kim | H04W 8/24 |
| 11,489,769 B2* | 11/2022 | Suthar | H04L 45/66 |
| 2015/0222413 A1 | 8/2015 | Pietilainen | |
| 2019/0149365 A1 | 5/2019 | Chatterjee et al. | |
| 2020/0112975 A1 | 4/2020 | Moon et al. | |
| 2020/0259896 A1* | 8/2020 | Sachs | H04L 67/12 |
| 2020/0267673 A1* | 8/2020 | Joseph | H04W 56/001 |
| 2021/0153018 A1* | 5/2021 | Fernandez Alonso | H04W 28/06 |
| 2022/0353167 A1* | 11/2022 | Mishra | H04L 43/0811 |

FOREIGN PATENT DOCUMENTS

| | | |
|---|---|---|
| WO | 2020/081060 A1 | 4/2020 |
| WO | 2020/111994 A1 | 6/2020 |
| WO | 2020/111995 A1 | 6/2020 |

OTHER PUBLICATIONS

"3rd Generation Partnership Project; Technical Specification Group Services and System Aspects; Study on enhancements for cyber-physical control applications in vertical domains; Stage 1 (Release 17)", 3GPP TR 22.832, V17.1.0, Dec. 2019, pp. 1-91.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"IEEE Standard for Local and Metropolitan Area Networks-Timing and Synchronization for Time-Sensitive Applications", IEEE Computer Society, IEEE Std 802.1AS™-2020, Jan. 30, 2020, 418 pages.

Farkas et al., "5G—Ultra-Reliable Wireless Technology with Low Latency draft-farkas-5g-raw-00e", Internet-Draft, Mar. 9, 2020, pp. 1-20.

International Search Report and Written Opinion received for corresponding Patent Cooperation Treaty Application No. PCT/EP2021/069744, dated Oct. 14, 2021, 14 pages.

"3rd Generation Partnership Project; Technical Specification Group Services and System Aspects; Study on enhanced support of Industrial Internet of Things (IIoT) in the 5G System (5GS) (Release 17)", 3GPP TR 23.700-20, V0.4.0, Jun. 2020, pp. 1-58.

Communication pursuant to Article 94(3) EPC dated May 24, 2024 corresponding to European Patent Application No. 21745771.2.

Notice of Allowance received for corresponding European Patent Application No. 21745771.2, dated Jan. 30, 2025, 7 pages.

Office Action received for corresponding ChinesePatent Application No. 202180061977.2, dated Apr. 29, 2025, 6 pages of office action and 4 pages of translation available.

\* cited by examiner

WORKING CLOCK DETERMINATION FOR A MOBILE USER EQUIPMENT

RELATED APPLICATION

This application claims priority to PCT Application No. PCT/EP2021/069744, filed on Jul. 15, 2021, which claims priority from U.S. Provisional Application No. 63/061,502, filed on Aug. 5, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for working clock determination for a mobile user equipment.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

BRIEF DESCRIPTION OF THE DRAWINGS

For proper understanding of example embodiments, reference should be made to the accompanying drawings, wherein:

FIG. 9($b$) illustrates another apparatus, according to certain example embodiments.

DETAILED DESCRIPTION

Figure 1:
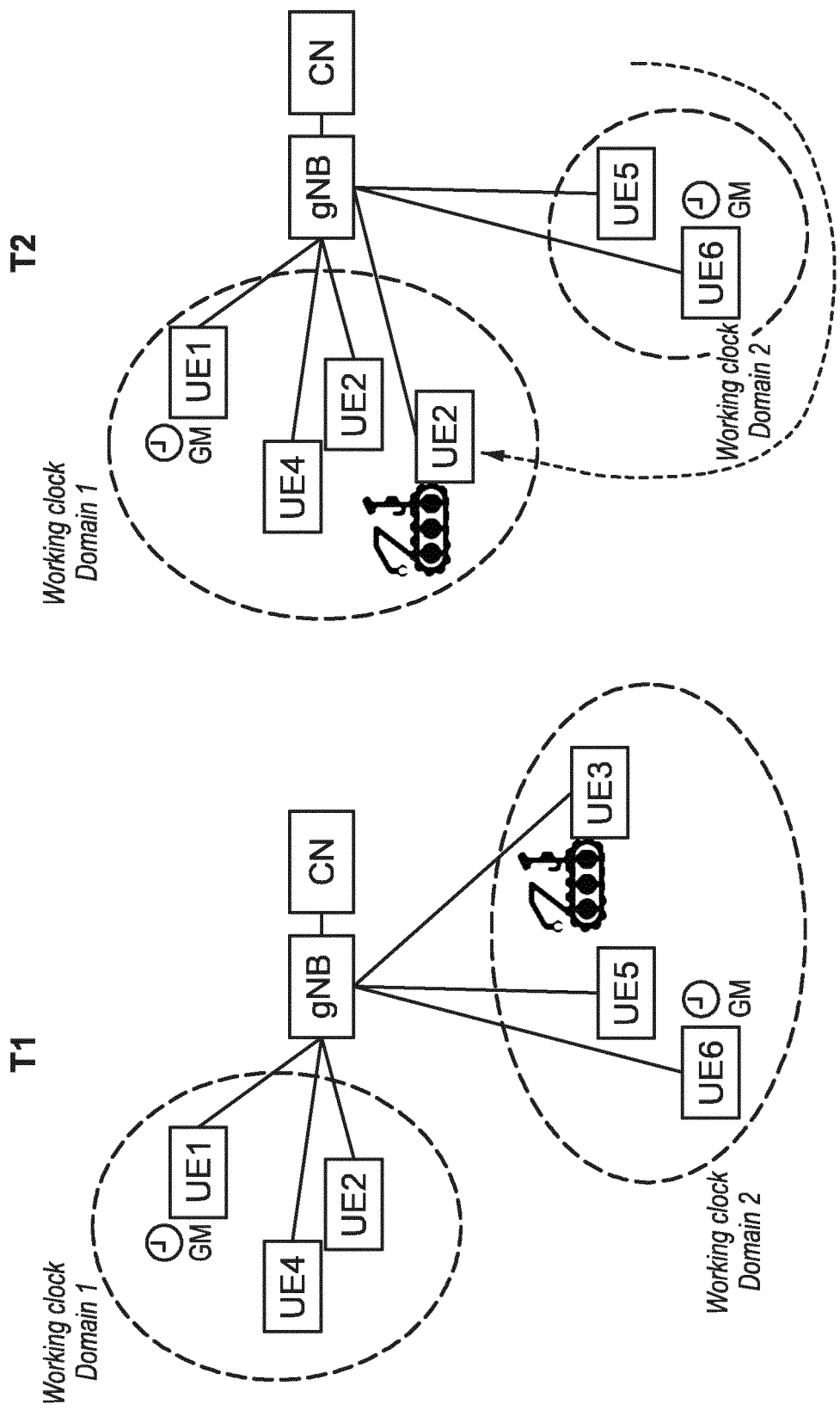
FIG. 1 illustrates an example of a multiple clock domain scenario in a communication network.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for working clock determination for a mobile user equipment (UE).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

The 5G network with time sensitive networking (TSN)/time synchronization support may include integration of two types of synchronization clocks such as, for example, a global time domain and working clock domains. According to certain example embodiments, the global time domain may represent a 5G clock, and the working clock domains may represent vertical time domains. Furthermore, a specific time domain (TD) may include devices that may cooperate in the physical world. This may include, for example, robots, automated guided vehicles (AGVs), conveyor belts, and others. In certain example embodiments, TDs may be independent from each other, especially with respect to time scale and precision of time synchronization.

Some clock synchronization service level requirements, e.g., as specified by $3^{rd}$ Generation Partnership Project (3GPP), may be associated to the global time domain and working clock domain support in 5G. Such requirements may include, for example, the 5G system supporting networks with up to 128 working clock domains (with different synchronization domain identifiers/domain numbers), including for UEs connected through the 5G network. Another requirement may include the 5G system providing an interface at the UE to determine and to configure the precision and the time scale of the working clock domain. A further requirement may include the 5G system providing a suitable means to support the management of the merging and separation of working clock domains. The provided means may be interoperable with the corresponding mechanisms of TSN.

3GPP specifications may also include similar service requirements for the management of merging and separation of working clock domains as those mentioned above. The rationale is a common deployment for a general 5G network infrastructure serving an industrial/energy/automation use case, which does not map to the structure of the processes running in the use case. In other words, the user plane function (UPF) and the serving gNB may provide service to several UEs that may work with different TDs, which may lead to a situation where multiple TDs communicate through the same UPF/gNB.

3GPP specifications describe support for TSN time synchronization provided by the 5G system (5GS). For instance, the 5GS may have two synchronization processes: 1) 5GS synchronization, and 2) TSN domain synchronization. Each synchronization process may be considered independent from each other, and in certain cases, the gNB may be synchronized to the 5G grand master (GM) clock. The 5GS synchronization may be used for synchronization of nodes within the 3GPP system including, for example, between 5G radio access network (RAN) and UPF. The 5GS synchronization may also be used for synchronization of nodes within 5G RAN including, for example, between a gNB and a UE. In addition, 5G RAN synchronization between the gNB and UE may be achieved via reference time information signaling. As for TSN domain synchronization, this may provide synchronization service to a TSN network, and the process may follow IEEE specifications.

In certain cases, when multiple working clock domains are supported, 3GPP specifications describe that the UPF/network side TSN translator (NW-TT) may send generic precision time protocol (gPTP) messages or PTP messages for the domains to the UE(s)/device side TSN translator(s) (DS-TT) in the protocol data unit (PDU) sessions. If PTP is considered, instead of TSN application function (AF) being the AF, if it is gPTP, then TSN AF may apply. In addition, the UE may forward information related to all the working clock domain as-is to the connected DS-TT(s) that synchronizes with the (g)PTP message that it may need based on a domain number supported by the end device, and the domain number carried by the (g)PTP message. However, this may be wasteful of network and spectral resources as it can unnecessarily increases the size of the user plane (UP) payload. In case of TSN traffic, time bound transmission may be critical and, thus, increased payload may consume unnecessary radio resources for transmission, which risks late delivery and UP congestion.

FIG. 1 illustrates an example of a multiple clock domain scenario in a communication network. Integration of TSN/time synchronization support and 5G wireless networks may be affected by mobility. For instance, mobile TSN devices may move around (e.g., different factory floors where different working clock domains are utilized). As illustrated in FIG. 1, such devices, even though they may require a broad set of clock domains at different times, may at certain times require a single or a subset of the clock domains to be provided to them depending on their current location. An assumption by 3GPP is that the DS-TT may know which time domain number is supported. Thus, the end station may know which clock domain to use at a particular time.

According to certain example embodiments, TDs of interest may be introduced for the UE as part of the PDU session management to optimize time information distribution to the UEs. In certain example embodiments, by using the available TDs, the 5G core (5GC) may update the UP configuration to provide the UE with just the synchronization messages for the TD(s) that may be needed by the UE. That is, in certain example embodiments, the UPF may be able to dynamically determine the TD(s) for which synchronization messages may need to be forwarded to a UE based on a combination of parameters including, for example, mobility events, location, and/or traffic inspection. According to certain example embodiments, the mobility events may correspond to mobility of the UE. For example, the UE may be changing the serving cell when the signal is stronger in the target cell than the source cell. Further in certain example embodiments, in the case of traffic inspection, if the UPF detects two UEs talking/communicating between each other (inspecting user plane traffic), and the UPF knows the TDs both UEs can work with, the traffic inspection can help determine the TD the UEs should receive.

In certain example embodiments, a session management function (SMF) may configure the UPF to enable the determination of the correct mapping between TD(s) and UE(s). To do so, the SMF may have two sources of information. One source of information may be provided by the UE. For instance, the UE may provide TD(s) information during PDU session management procedures (e.g., PDU session establishment or modification). Another source of information may be provided by a TSN application function (TSN AF). For example, the TSN AF may provide TD(s) information via a policy control function (PCF).

According to certain example embodiments, the TD (or working clock domain) determination at the UPF may be configured in various ways. For instance, one option may include the UE/DS-TT providing the required working clock domain numbers to the SMF during a PDU session establishment procedure. Once received, the SMF may forward this information to the UPF/NW-TT for the given PDU session, which enables the UPF/NW-TT to have knowledge of the domain number(s) that may be needed for a given UE/DS-TT PDU session. When the UPF/NW-TT receives a (g)PTP message containing time information related to a certain clock domain number, it may determine, based on information received from the SMF, whether a (g)PTP message needs to be sent to the given UE/DS-TT for a given PDU session. If the given UE/DS-TT needs the (g)PTP message, the UPF may include the corresponding (g)PTP message. If the given UE/DS-TT does not need the (g)PTP message, the UPF will not send it for the corresponding UE/DS-TT.

Certain example embodiments may provide another option to configure the TD determination at the UPF. For example, the TSN AF may obtain information about the mapping between the time domain in the (g)PTP message and the UEs/DS-TTs subscribed to this time domain either from the best master clock algorithm (BMCA) outcome or from the external configuration. In certain example embodiments, this mapping information may be given to the SMF through the PCF. Further, the SMF may associate the mapping information to the PDU sessions of the corresponding UEs/DS-TT, and configure the UPF accordingly. For instance, in certain example embodiments, the UPF may be configured by the SMF using N4 rules. According to certain example embodiments, the N4 rules may include packet detection rules (PDR) that may contain information to classify traffic (PDU(s)) arriving at the UPF. The N4 rules may also include forwarding action rules (FAR), quality of service (QoS) enforcement rules (QER), etc. Based on the associated PDU sessions and the time domain information (e.g., mapping information), the UPF/NW-TT may deliver the (g)PTP message to the corresponding UEs PDU sessions.

According to certain example embodiments, a further option to configure the TD determination at the UPF may be provided. In the above-mentioned solution, the BMCA outcome and hence the mapping information, may be available at the NW-TT. However, in other example embodiments, the NW-TT may provide the mapping information to the SMF either via UPF or via AF (or TSN AF). Then the association of the mapping information to the PDU sessions and configuration at the UPF may be performed as described above with respect to the SMF association of the mapping information to the PDU sessions, and the UPF/NW-TT delivering the (g)PTP message to the corresponding UE/DS-TT(s) PDU sessions. In other example embodiments, another option may be that the NW-TT by itself forwards the (g)PTP messages to the appropriate UE/DS-TT(s) transparently through 5GS using the BMCA outcome/mapping information.

Figure 2:
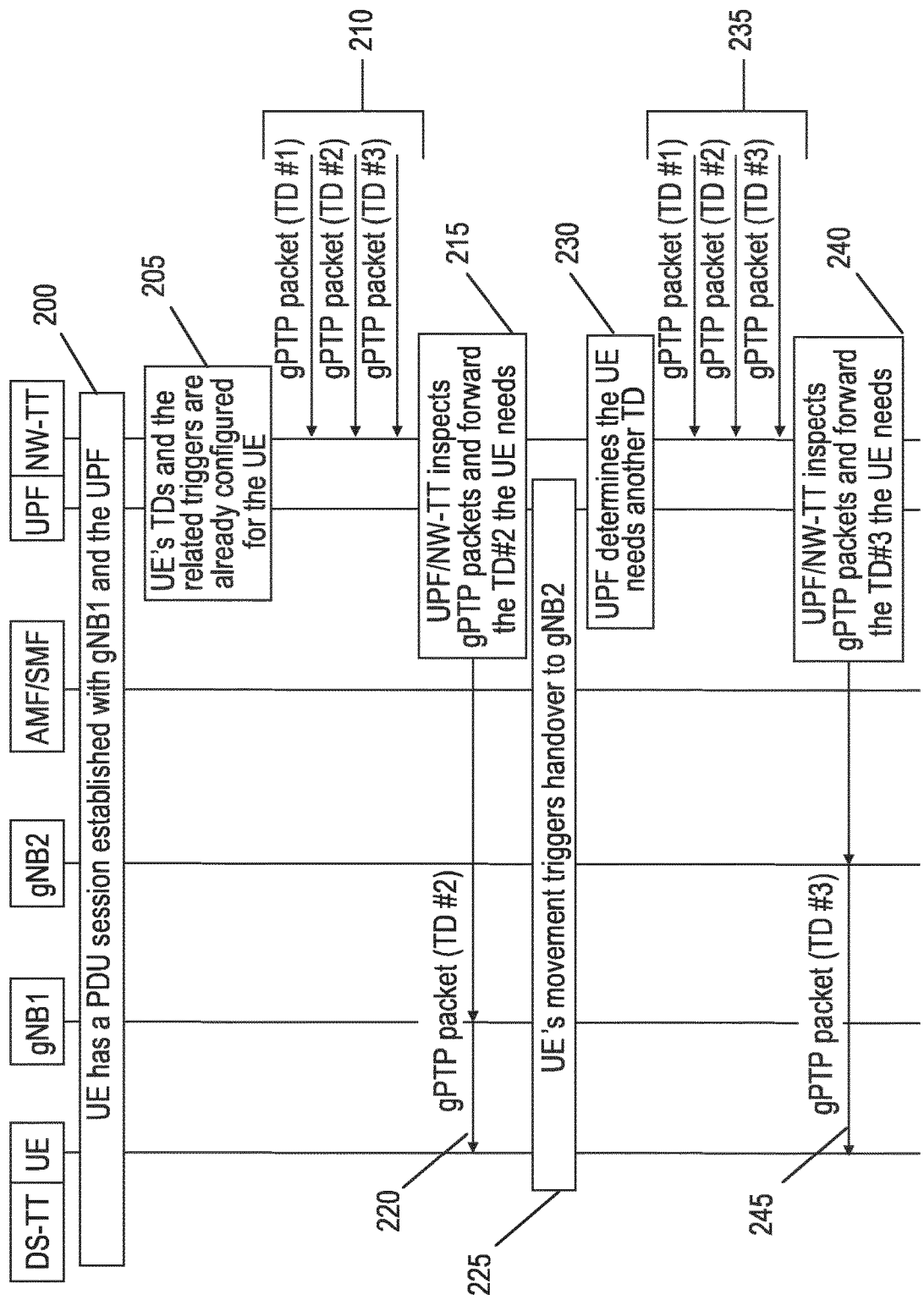
FIG. 2 illustrates a signal diagram of user plane function (UPF)—triggered dynamic management of a time domain (TD) forwarding, according to certain example embodiments.

FIG. 2 illustrates a signal diagram of user plane function (UPF)—triggered dynamic management of a time domain (TD) forwarding, according to certain example embodiments. As illustrated in FIG. 2, certain example embodiments may provide dynamic management of TD(s) of interest for the UE at the UPF. At 200, the UE may establish a PDU session with gNB1 and the UPF. At 205, the UE's TDs and the related triggers may already be configured for the UE at the UPF and, at 210, the NW-TT may receive various (g)PTP packets associated with respective TDs (e.g., TD #1, TD #2, and TD #3). According to certain example embodiments, the (g)PTP packets may include a domainNumber that identifies the TD. In addition, the contents of the (g)PTP message may include a message type, timestamp, domainNumber, correctionField, sequence ID, flags, etc. At 215, the UPF/NW-TT may inspect the (g)PTP packets, and forward the (g)PTP packet with the TD that the UE may need (e.g., (g)PTP packet (TD #2)) to gNB1. At 220, gNB1 may forward the (g)PTP packet (TD #2) to the UE.

As further illustrated in FIG. 2, at 225, the UE's movement may trigger handover from gNB1 to gNB2. At 230, the UPF may determine that the UE needs another TD and, at 235, the NW-TT may receive various (g)PTP packets with respective TDs (e.g., TD #1, TD #2, and TD #3). At 240, the UPF/NW-TT may inspect the (g)PTP packets, and forward the (g)PTP packet with the TD that the UE needs (e.g., (g)PTP packet (TD #3)) to gNB2. At 245, (g)NB2 may forward the (g)PTP packet (TD #3) to the UE.

As illustrated in FIG. 2, in certain example embodiments, the mapping between the UEs and TDs may be updated in case the UE is moving. For instance, the UE may be moving around different factory floors, or may be interacting with UEs/devices utilizing different TDs. According to certain example embodiments, updating the mapping between the UEs and TDs may be triggered by the UE/AGV based on its location in the network. For example, the UE/AGV may be entering a new cell, entering a predefined zone determined based on the position determined based on a 3GPP positioning system, or knowledge of clock domain being used by other UEs in the vicinity (e.g., signaled by the gNB, or advertised by the UEs over sidelink).

According to other example embodiments, the updating may be triggered the UPF itself. For example, the updating may be triggered by the UPF based on certain mobility events such as handover indication from the gNB/SMF, based on the UE changing its serving UPF, or upon receiving the frame for/from the UEs in the vicinity from/for the AGV. In this case, the UPF may need to be aware of the overall list of TDs the UE is subscribed to, and of the TDs which are used in a certain network location. According to further example embodiments, the updating of the mapping between the UEs and TDs may be signaled from the TSN controller via NW-TT. For example, this may be done based on the knowledge of the location of the AGV by the TSN controller.

Figure 3:
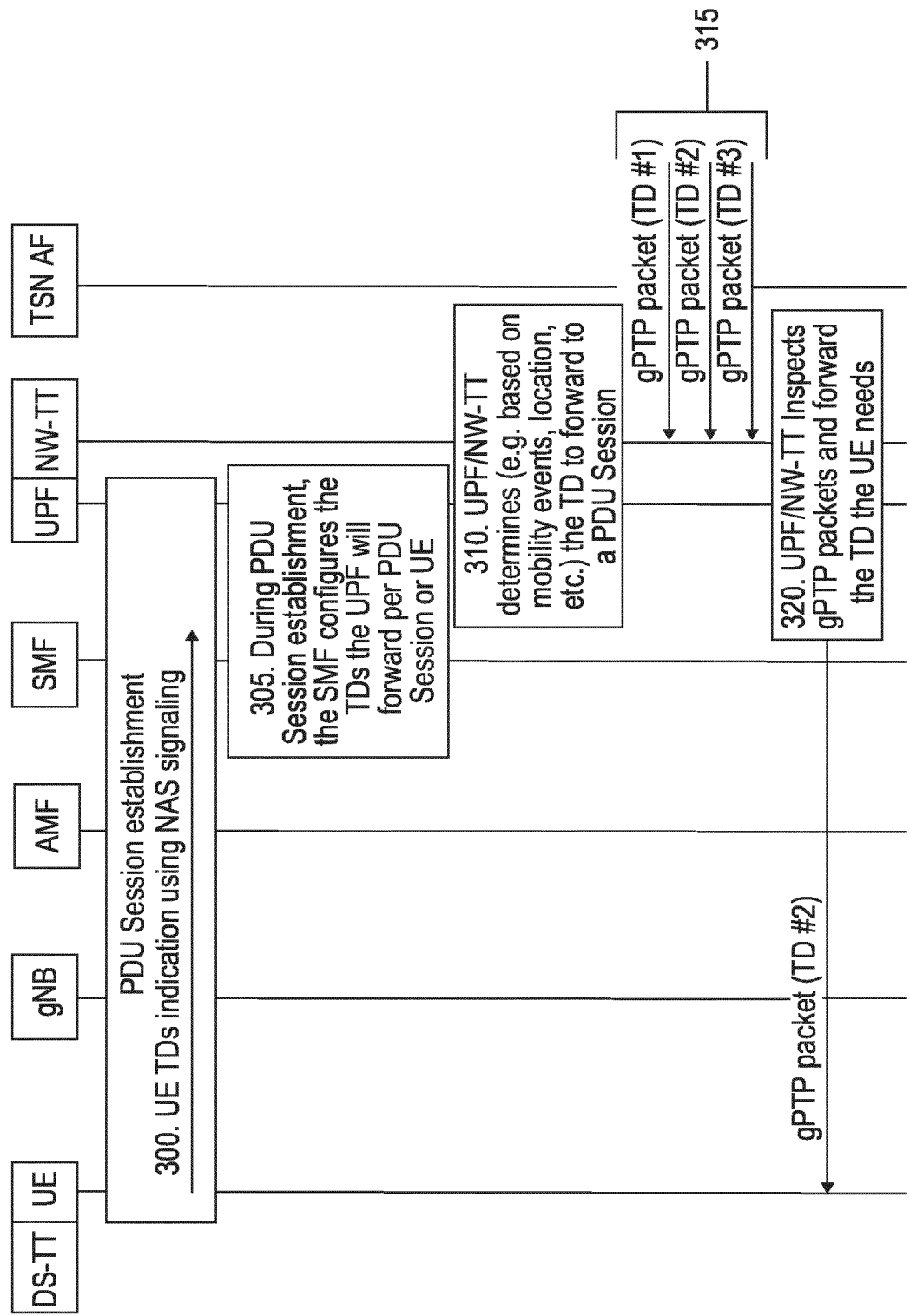
FIG. 3 illustrates a signal diagram for configuring the UPF, according to certain example embodiments.

FIG. 3 illustrates a signal diagram for configuring the UPF, according to certain example embodiments. As illustrated in FIG. 3, at 300, a PDU session may be stablished with the UPF, and the UE TDs may be indicated using non-access stratum (NAS) signaling. In particular, at 300, the UE may trigger a session management procedure (i.e., modification or establishment) to provide TDs information to the network. In some example embodiments, the TDs information may be encapsulated within a NAS information element, and it may be transparently forwarded by the gNB and AMF to the SMF. At 305, during PDU session establishment, the SMF may configure the TDs that the UPF will forward per PDU session or UE. For example, in certain example embodiments, the SMF may reconfigure the UPF user plane processing (i.e., N4 rules) to ensure that the UEs are receiving the TDs (e.g., via packet detection rules). Further, the configuration of the TDs may refer to sending the TDs information to the UPF so that the UPF is aware of the domain numbers that may be needed for a given UE/PDU session.

In certain example embodiments, the SMF may forward the TDs information related to certain UE and/or PDU session to the UPF during the configuration. For instance, according to certain example embodiments, the SMF may manage the TDs the UPF needs to forward to every UE. In addition, the UPF may learn, based on the traffic flows the UEs are exchanging, what TDs should be used. Further, in the SMF managing the TDs and the UPF learning, the SMF may provide some initial configuration, and the UPF may update the information and notify the SMF. In certain example embodiments, the TDs information may include triggers to switch the TD to forward to a UE, forwarding rules, or updates in the association between TD(s), UEs, and PDU sessions. For instance, in certain example embodiments, the triggers may include the detected traffic the UPF is forwarding per UE, or it could be an on demand requested by the SMF due to a location change of the UE reported by the AMF. Alternatively, there may be a temporal window the UE should be synchronized to a specific TD, or due to a new request done by the TSN AF or AF. According to certain example embodiments, the information exchanged may impact the packet forwarding control protocol (PFCP) between SMF and UPF to include extensions for the new set of information (e.g., new set of TDs information and possible triggers or policies to switch between the TDs). Additionally, the SMF may be subscribed to mobility events to obtain updates from the access and mobility management function (AMF), and report to the UPF if needed.

At 310, using the information obtain at 305, the UPF may update the local information associating TD(s) and UEs. According to certain example embodiments, the local information may include the mapping between the TDs and the UEs, the policies to switch between TDs, triggers to report to the SMF, etc. In particular, the UPF/NW-TT may determine (e.g., based on mobility events, location, etc.) the TD to forward to a PDU session. According to certain example embodiments, at 310, the UPF may maintain a local table with the association between TDs numbers and PDU sessions. At 315, the NW-TT may receive (g)PTP packets with TD #1, TD #2, and TD #3. Further, at 320, the UPF/NW-TT may inspect the (g)PTP packets, and forward the TD (e.g., TD #3) the UE needs. In particular, when a (g)PTP packet is received in the UPF/NW-TT, the TD number may be read, and the packet may be forwarded to the matching PDU sessions the UPF has configured.

Figure 4:
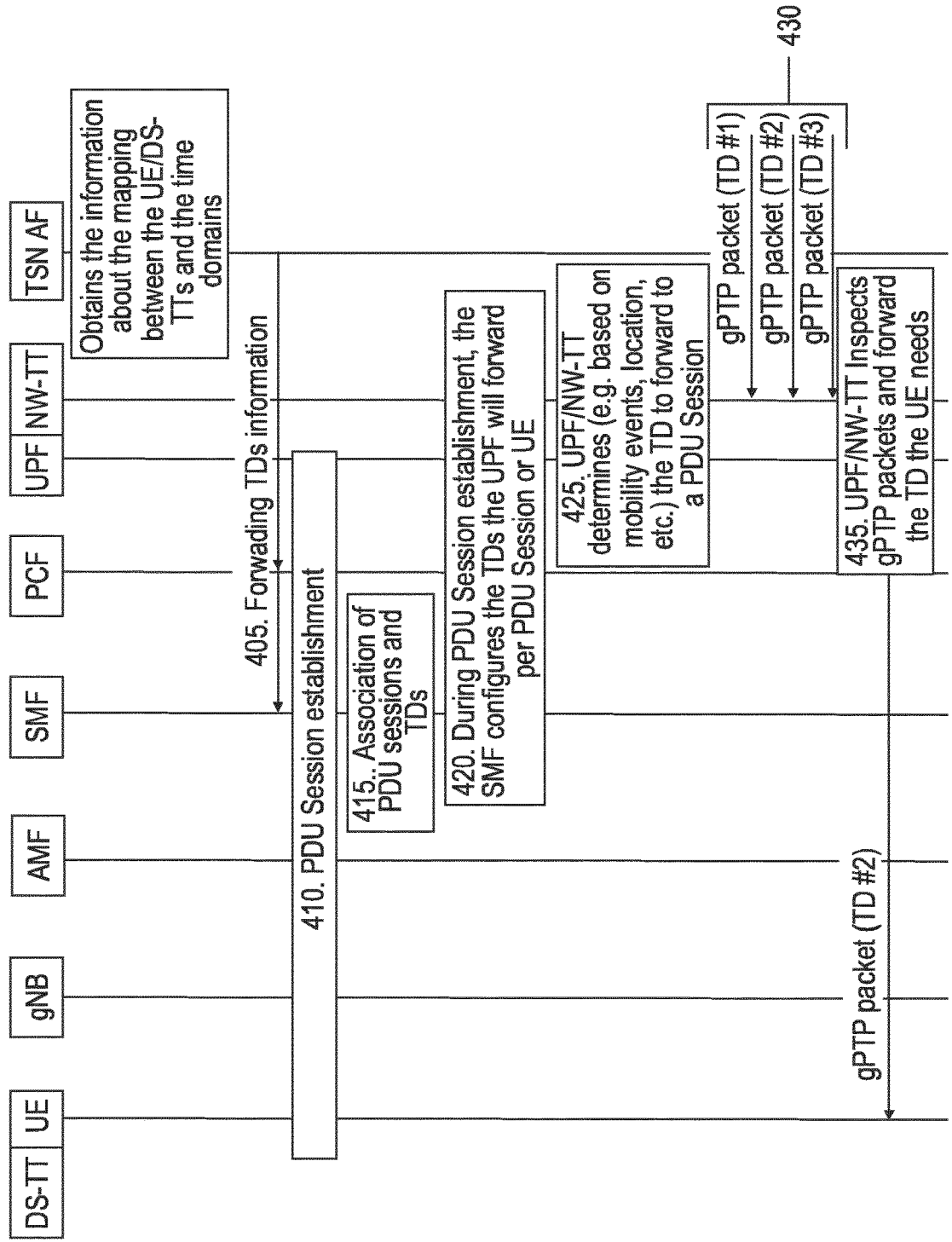
FIG. 4 illustrates another signal diagram for configuring the UPF, according to certain example embodiments.

FIG. 4 illustrates another signal diagram for configuring the UPF, according to certain example embodiments. At 400, the TSN AF may obtain the information about the mapping between UEs/DS-TT(s) subscribed for the TDs and the TDs. In addition, the TSN AF may prepare the mapping between the UEs/DS-TT ports and the TDs. At 405, the TSN AF may forward TDs information to the PCF, which may subsequently forward the TDs information to the SMF. In particular, the TSN AF may provide the mapping information to the 5G network via exposure framework to the PCF. The PCF may then forward the mapping information to the SMF, and the SMF may store the information. According to certain example embodiments, this exchange may extend the time synchronization exposure framework to let the AF forward the information about the TDs. As further illustrated in FIG. 4, at 410, a PDU session may be established between the network elements.

At 415, the SMF may correlate the information received from the TSN AF and the port binding information to track the association of TDs, UEs, and PDU sessions. Further, as illustrated in FIG. 4, steps 420, 425, 430, and 435 may be similar to steps 305, 310, 315, and 320 in FIG. 3. Specifically, at 420, during PDU session establishment, the SMF may configure the TDs that the UPF may forward per PDU session or UE. According to certain example embodiments, the SMF may send TDs information indication to the UPF during the configuration of the UPF. In other words, the SMF may send TD information to the UPF. At the end, the SMF may configure the routing at the UPF and, thus, every piece of information that may be useful for packet classification may be considered. In addition, the SMF may forward the TDs information related to certain UE and/or PDU session to the UPF. In certain example embodiments, the TDs information may include triggers to switch the TD to forward to a UE, forwarding rules, or updates in the association between TD(s), UEs, and PDU sessions. According to certain example embodiments, the information exchanged may impact the PFCP between SMF and UPF to include extensions for the new set of information. Additionally, the SMF may be subscribed to mobility events to obtain updates from the access and mobility management function (AMF), and report to the UPF if needed.

At 425, using the information obtained at 420, the UPF may update the local information associating TD(s) and UEs. In particular, the UPF/NW-TT may determine (e.g., based on mobility events, location, etc.) the TD to forward to a PDU session. According to certain example embodiments, in this step, the UPF may maintain a local table with the association between TDs numbers and PDU sessions. At 430, the NW-TT may receive (g)PTP packets associated with TD #1, TD #2, and TD #3. Further, at 435, the UPF/NW-TT may inspect the (g)PTP packets, and forward the (g)PTP packet associated with a corresponding TD (e.g., TD #3) the UE needs. In particular, when a (g)PTP packet is received in the UPF/NW-TT, the TD number may be read, and the packet may be forwarded to the matching PDU sessions the UPF has configured.

Certain example embodiments may provide a further solution to configure the TD (or working clock domain) determination at the UPF. For instance, this solution may have a similar signaling flow as illustrated in FIG. 4. However, the mapping information may be available at the NW-TT, which provides this to the SMF via UPF or via AF. The steps after 405 may be the same. Further, in certain example embodiments, the SMF may eventually configure the UPF with that information. In addition, based on the configuration from the SMF, UPF may be able to determine which Ethernet frames are to be mapped to which PDU session based on their Ethernet multicast destination address and/or time domain number (e.g., time domain information (TDs)). According to certain example embodiments, when the SMF sends the N4 rules to the UPF (e.g., PDR, FAR, QER), the classification of the traffic may include specific filters for the (g)PTP packets, or the use of the multicast address as the filter of the PDRs. Thus, if the SMF is responsible for completely managing this process in the UPF, the SMF may send the specific dedicated forwarding rules per UE to the UPF, and update the information when it is determined due to events triggered by the AMF or because of a notification from the UPF.

Figure 5:
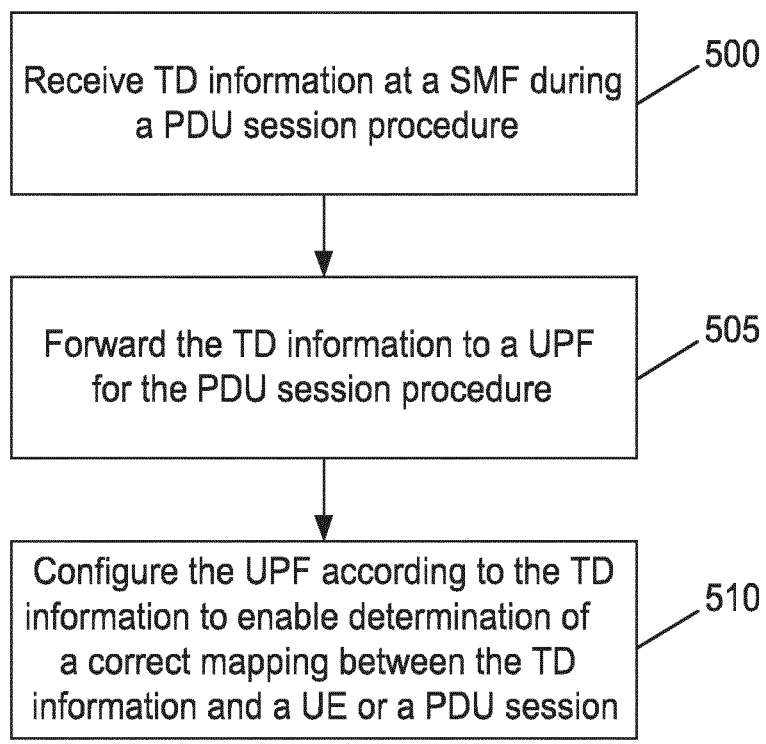
FIG. 5 illustrates a flow diagram of a method, according to certain example embodiments.

FIG. 5 illustrates a flow diagram of a method, according to certain example embodiments. In certain example embodiments, the flow diagram of FIG. 5 may be performed by a telecommunications network entity or network node in a 3GPP system, such as LTE or 5G-NR. For instance, in certain example embodiments, the method of FIG. 5 may be performed by a session management function, for instance similar to apparatus 20 illustrated in FIG. 9(*b*).

According to certain example embodiments, the method of FIG. 5 may include, at 500, receiving time domain information at a session management function during a protocol data unit (PDU) procedure. The method may also include, at 505, forwarding the time domain information to a user plane function for the PDU procedure. The method may further include, at 510, configuring the user plane function according to the time domain information to enable determination of a correct mapping between the time domain information and a user equipment or a PDU session.

According to certain example embodiments, the forwarding may include forwarding configuration including one or more extensions for a new set of time domain information. According to other example embodiments, the time domain information may include an associated working clock domain number, a trigger to switch a time domain to forward to the user equipment or the PDU session, a forwarding rule, a packet filter, or an update in an association between the time domain, the user equipment, and the PDU session. In certain example embodiments, the method may also include subscribing to a mobility event of the user equipment to obtain an update of the mobility event. In other example embodiments, the method may further include reporting the mobility events to the user plane function.

Figure 6:
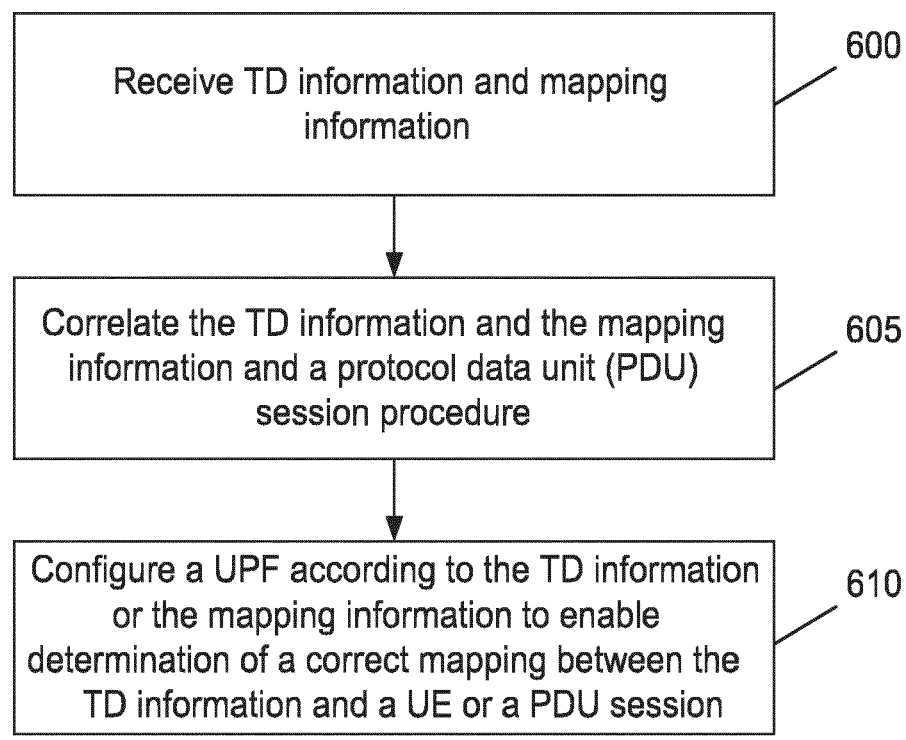
FIG. 6 illustrates a flow diagram of another method, according to certain example embodiments.

FIG. 6 illustrates a flow diagram of another method, according to certain example embodiments. In certain example embodiments, the flow diagram of FIG. 6 may be performed by a telecommunications network entity or network node in a 3GPP system, such as LTE or 5G-NR. For instance, in certain example embodiments, the method of FIG. 6 may be performed by a session management function, for instance similar to apparatus 20 illustrated in FIG. 9(*b*).

According to certain example embodiments, the method of FIG. 6 may include, at 600, receiving time domain information and mapping information. The method may also include, at 605, correlating the time domain information and the mapping information and a protocol data unit (PDU) session procedure. Further, at 610, the method may include configuring a user plane function according to the time domain information or the mapping information to enable determination of a correct mapping between the time domain information and a user equipment or a PDU session.

According to certain example embodiments, the mapping information may include a mapping between the time domain information and a user equipment subscribed to the time domain information. In certain example embodiments, the mapping information may be received via non-access stratum signaling from a user equipment, or via exposure frame from at time sensitive networking application function or an application function, or derived from an outcome of a best master clock algorithm. In other example embodiments, the configuring may be performed during the PDU session procedure. In some example embodiments, the time domain information may include an associated working clock domain number, a trigger to switch a time domain to forward to the user equipment or PDU session, a forwarding rule, a packet filter, or an update in an association between the time domain, the user equipment, and the PDU session. According to certain example embodiments, the method may also include subscribing to a mobility event of the user equipment to obtain an update of the mobility event. According to further example embodiments, the method may include reporting the mobility event to the user plane function.

Figure 7:
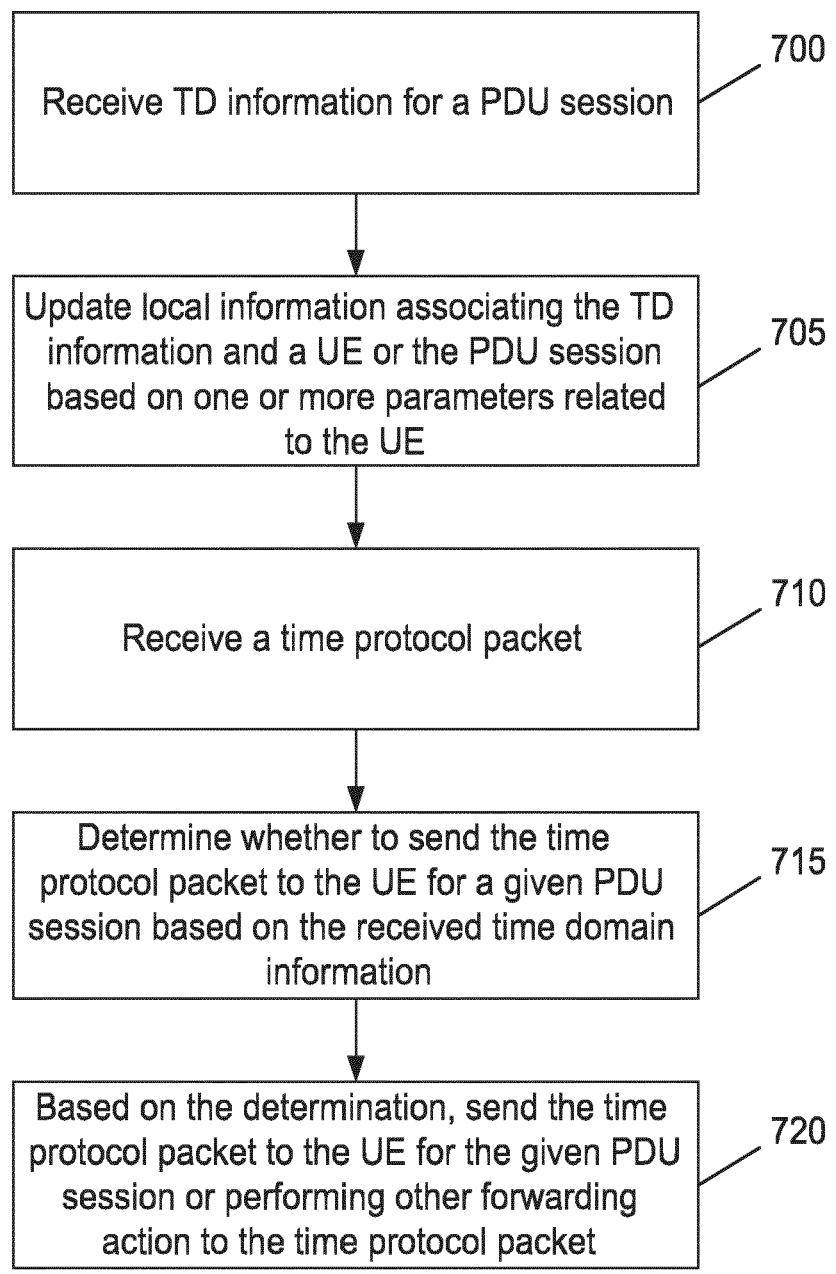
FIG. 7 illustrates a flow diagram of another method, according to certain example embodiments.

FIG. 7 illustrates a flow diagram of another method, according to certain example embodiments. In an example embodiment, the method of FIG. 7 may be performed by a telecommunications network entity or network node in a 3GPP system, such as LTE or 5G-NR. For instance, in certain example embodiments, the method of FIG. 7 may be performed by a UPF similar to apparatus 20 illustrated in FIG. 9(*b*).

According to certain example embodiments, the method may include, at 700, receiving time domain information for a protocol data unit (PDU) session. The method may also include, at 705, updating local information associating the time domain information and a user equipment or the PDU session based on one or more parameters related to the user equipment. The method may further include, at 710, receiving a time protocol packet. In addition, at 715, the method may include determining whether to send the time protocol packet to the user equipment for a given PDU session based on the received time domain information. Further, at 720, the method may include, based on the determination, sending the time protocol packet to the user equipment for the given PDU session or performing other forwarding action to the time protocol packet. For instance, in certain example embodiments, the UPF may keep the packet, drop it, or replace it.

According to certain example embodiments, the one or more parameters may include information relating to one or more of a mobility event, a location, or a traffic inspection. According to other example embodiments, the time protocol packet may be a generic precision time protocol packet or a precision time protocol packet. According to further example embodiments, the time protocol packet may include time information related to a clock domain number. In certain example embodiments, the updating may include maintaining a local table with an association between the time domain information and the PDU session.

Figure 8:
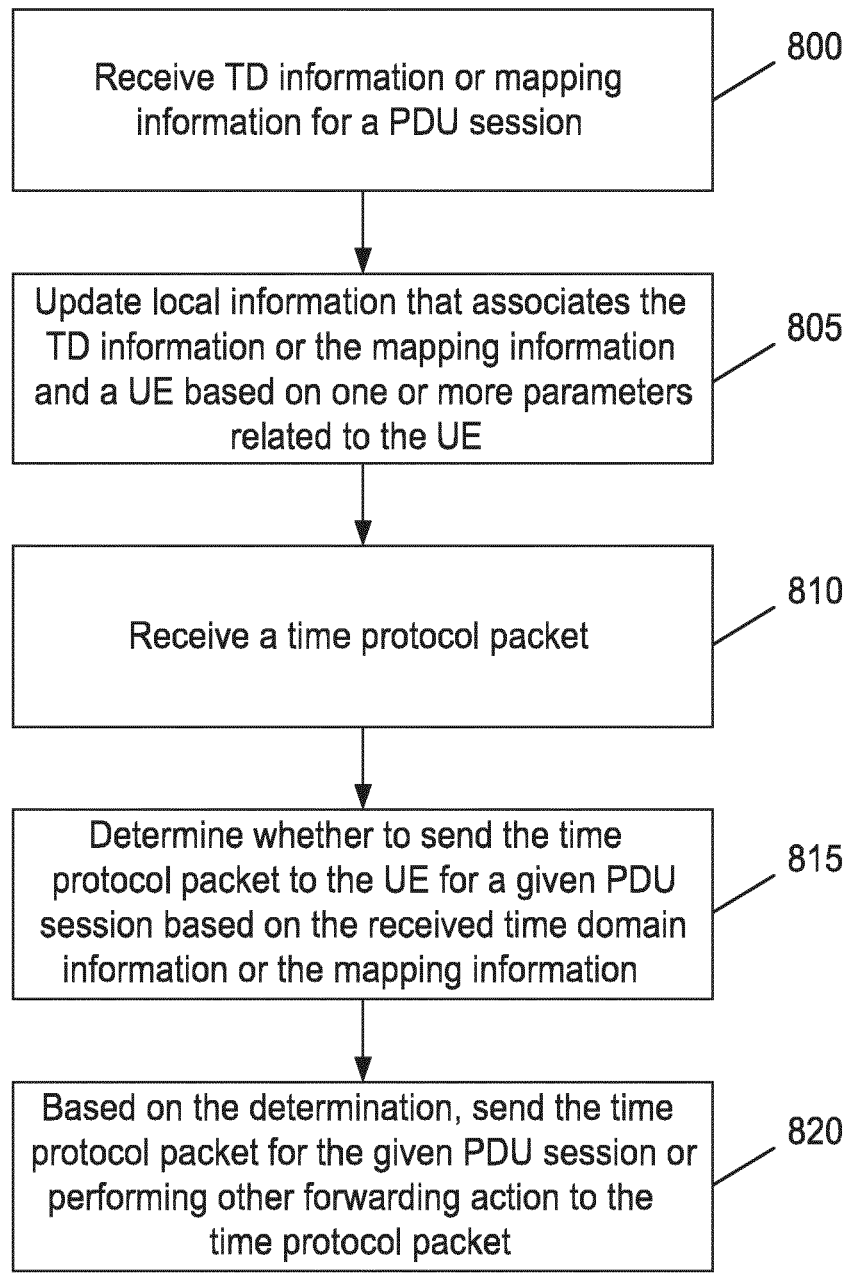
FIG. 8 illustrates a flow diagram of another method, according to certain example embodiments.

FIG. 8 illustrates a flow diagram of another method, according to certain example embodiments. In an example embodiment, the method of FIG. 8 may be performed by a telecommunications network entity or network node in a 3GPP system, such as LTE or 5G-NR. For instance, in certain example embodiments, the method of FIG. 8 may be performed by a UPF similar to apparatus 20 illustrated in FIG. 9(*b*).

According to certain example embodiments, the method may include, at 800, receiving time domain information or mapping information for a protocol data unit (PDU) session. The method may also include at 805, updating local information that associates the time domain information or the mapping information and the user equipment based on one or more parameters related to the user equipment. The method may further include, at 810, receiving a time protocol packet. At 815, the method may include determining whether to send the time protocol packet to the user equipment for a given PDU session based on the received time domain information or the mapping information. In addition, at 820, the method may include based on the determination, sending the time protocol packet to the user equipment for the given PDU session or performing other forwarding action to the time protocol packet. For instance, in certain example embodiments, the UPF may keep the packet, drop it, or replace it.

According to certain example embodiments, the mapping information may include a mapping between the time domain information and a user equipment subscribed to the time domain information. In certain example embodiments, the mapping information may be received from a user equipment, or via an exposure framework from a time sensitive networking application function or an application function, or derived from an outcome of a best master clock algorithm. In some example embodiments, the updating may include maintaining a local table with the association between the time domain information and the PDU session. In other example embodiments, the one or more parameters may include one or more of a mobility event, a location, or a traffic inspection. According to certain example embodiments, the time protocol packet may be a generic precision time protocol packet or a precision time protocol packet.

FIG. 9(*a*) illustrates an apparatus 10 according to certain example embodiments. In certain example embodiments, apparatus 10 may be a node or element in a communications network or associated with such a network. For instance, in certain example embodiments, apparatus 10 may be a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. In other example embodiments, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9(*a*).

Figure 9A:
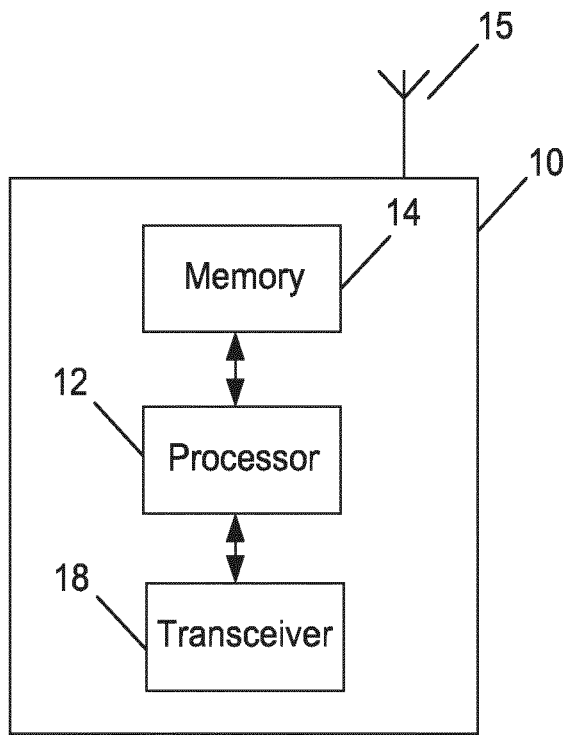
FIG. 9($a$) illustrates an apparatus, according to certain example embodiments.

As illustrated in the example of FIG. 9(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

Figure 9B:
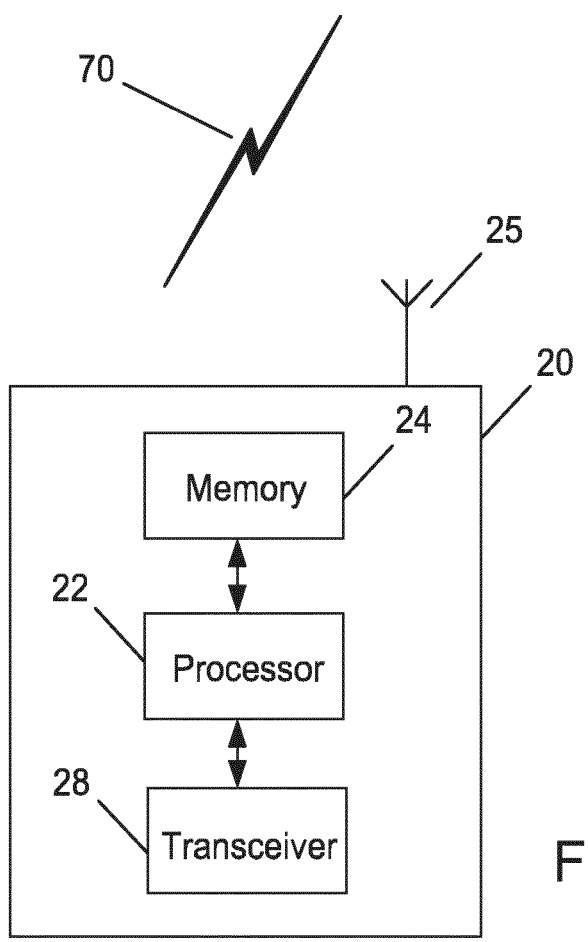

FIG. 9(b) illustrates an apparatus 20 according to certain example embodiments. In certain example embodiments, the apparatus 20 may be a network element, node, host, or server in a communication network or serving such a network. For example, apparatus 20 may be a network element including, for example, an AMF of 5GC, a UPF, or a SMF. In other example embodiments, apparatus 20 may be a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 9(b).

As illustrated in the example of FIG. 9(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiments, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 20 may be a network element, node, host, or server in a communication network or serving such a network. For example, apparatus 20 may be a AMF, SMF, satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain example embodiments, apparatus 20 may be controlled by memory 24 and processor 22 to perform the functions associated with any of the embodiments described herein.

For instance, in certain example embodiments, apparatus 20 may be controlled by memory 24 and processor 22 to receive time domain information at a session management function during a protocol data unit (PDU) session procedure. Apparatus 20 may also be controlled by memory 24 and processor 22 to forward the time domain information to a user plane function for the PDU session procedure. Apparatus 20 may further be controlled by memory 24 and processor 22 to configure the user plane function according to the time domain information to enable determination of a correct mapping between the time domain information and a user equipment or a PDU session.

In other example embodiments, apparatus 20 may be controlled by memory 24 and processor 22 to receive time domain information and mapping information. Apparatus 20 may also be controlled by memory 24 and processor 22 to correlate the time domain information and the mapping information and a protocol data unit (PDU) session procedure. In addition, apparatus 20 may be controlled by memory 24 and processor 22 to configure a user plane function according to the time domain information or the mapping information to enable determination of a correct mapping between the time domain information and a user equipment or a PDU session.

In other example embodiments, apparatus 20 may be controlled by memory 24 and processor 22 to receive time domain information for a protocol data unit (PDU) session. Apparatus 20 may also be controlled by memory 24 and processor 22 to update local information associating the time domain information and a user equipment or the PDU session based on a combination of parameters related to the user equipment. Apparatus 20 may further be controlled by memory 24 and processor 22 to receive a time protocol packet. In addition, apparatus 20 may be controlled by memory 24 and processor 22 to determine whether to send the time protocol packet to the user equipment for a given PDU session based on the received time domain information. Further, apparatus 20 may be controlled by memory 24 and processor 22 to, based on the determination, send the time protocol packet to the user equipment for the given PDU session or perform other forwarding action to the time protocol packet.

In other example embodiments, apparatus 20 may be controlled by memory 24 and processor 22 to receive time domain information or mapping information for a protocol data unit (PDU) session. Apparatus 20 may also be controlled by memory 24 and processor 22 to update local information that associates the time domain information or the mapping information and a user equipment based on one or more parameters related to the user equipment. Apparatus 20 may further be controlled by memory 24 and processor 22 to receive a time protocol packet. In addition, apparatus 20 may be controlled by memory 24 and processor 22 to determine whether to send the time protocol packet to the user equipment for a given PDU session based on the received time domain information or the mapping information. Further, apparatus 20 may be controlled by memory 24 and processor 22 to, based on the determination, send the time protocol packet to the user equipment for the given PDU session or perform other forwarding action to the time protocol packet.

Further example embodiments may provide means for performing any of the functions, steps, or procedures described herein. For example one example embodiment may be directed to an apparatus that includes means for receiving time domain information at a session management function during a protocol data unit (PDU) session procedure. The apparatus may also include means for forwarding the time domain information to a user plane function for the PDU session procedure. The apparatus may further include means for configuring the user plane function according to the time domain information to enable determination of a correct mapping between the time domain information and a user equipment.

Other example embodiments may be directed to an apparatus that includes means for receiving time domain information and mapping information. The apparatus may also include means for storing the time domain information and mapping information. The apparatus may further include means for correlating the time domain information and the mapping information. In addition, the apparatus may include means for configuring a user plane function according to the time domain information or the mapping information to enable determination of a correct mapping between the time domain information and a user equipment.

Other example embodiments may be directed to a further apparatus that includes means for receiving time domain information for a protocol data unit (PDU) session. The apparatus may also include means for updating local information associating the time domain information and a user equipment based on a combination of parameters related to the user equipment. The apparatus may further include means for receiving a time protocol packet. In addition, the apparatus may include means for determining whether the time protocol packet needs to be sent to the user equipment for a given PDU session based on the received time domain information. The apparatus may also include means for, based on the determination, sending the time protocol packet to the user equipment for the given PDU session or performing other forwarding action to the time protocol packet.

Other example embodiments may be directed to a further apparatus that includes means for receiving time domain information or mapping information for a protocol data unit (PDU) session. The apparatus may also include means for updating local information that associates the time domain information or the mapping information and a user equipment based on a combination of parameters related to the user equipment. The apparatus may further include means for receiving a time protocol packet. In addition, the apparatus may include means for determining whether the time protocol packet needs to be sent to the user equipment for a given PDU session based on the received time domain information or the mapping information. The apparatus may also include means for, based on the determination, sending the time protocol packet to the user equipment for the given PDU session or performing other forwarding action to the time protocol packet.

Certain example embodiments described herein provide several technical improvements, enhancements, and/or advantages. In some example embodiments, it may be possible to introduce TDs of interest for the UE as part of the PDU session management to optimize time information distribution to UEs. Using the available TDs, the 5GC may update the user plane configuration to provide the UE only with the synchronization messages for the TD(s) that are needed by the UE. According to certain example embodiments, it may be possible for the UPF to dynamically determine the TD(s) for which synchronization messages need to be forwarded to a UE based on a combination of parameters related to the UE including, for example, mobility events, location, and traffic inspection.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

5GC 5G Core
5GS 5G System
AF Application Function
AMF Access and Mobility Management Function
CN Core Network
DN Data Network
DS-TT Device-Side TSN Translator
eNB Enhanced Node B
GM Grand Master
gNB 5G or Next Generation NodeB
gPTP Generic Precision Time Protocol
LTE Long Term Evolution
NAS Non-Access Stratum
NR New Radio
NW-TT Network-Side TSN Translator
PCF Policy Control Function
RAN Radio Access Network
RRC Radio Resource Control
SIB System Information Block
SMF Session Management Function
TD Time Domain
TSC Time Sensitive Communications
TSN Time Sensitive Networking
UE User Equipment
UL Uplink
UPF User Plane Function

We claim:

1. A method, comprising:
receiving, at a user plane function (UPF), time domain information for a protocol data unit (PDU) session;
updating local information associating the time domain information and a user equipment or the PDU session based on one or more parameters related to the user equipment, the one or more parameters comprising information relating to one or more of a mobility event, a location, or a traffic inspection;
receiving a time protocol packet;
determining whether to send the time protocol packet to the user equipment for a given PDU session based on the received time domain information; and
based on the determination, sending the time protocol packet to the user equipment for the given PDU session or performing other forwarding action to the time protocol packet.

2. The method according to claim 1, wherein the time protocol packet is a generic precision time protocol packet or a precision time protocol packet.

3. The method according to claim 1, wherein the time protocol packet comprises time information related to a clock domain number.

4. The method according to claim 1, wherein the updating comprises maintaining a local table with an association between the time domain information and the PDU session.

5. A method, comprising:
receiving, at a user plane function (UPF), time domain information or mapping information for a protocol data unit (PDU) session;
updating local information that associates the time domain information or the mapping information and a user equipment based on one or more parameters related to the user equipment, the one or more parameters comprising information relating to one or more of a mobility event, a location, or a traffic inspection;
receiving a time protocol packet;
determining whether to send the time protocol packet to the user equipment for a given PDU session based on the received time domain information or the mapping information; and
based on the determination, sending the time protocol packet to the user equipment for the given PDU session or performing other forwarding action to the time protocol packet.

6. The method according to claim 5, wherein the mapping information comprises a mapping between the time domain information and a user equipment subscribed to the time domain information.

7. The method according to claim 5, wherein the mapping information is received via non-access stratum signaling from a user equipment, or via exposure framework from a time sensitive networking application function or an application function, or derived from the outcome of a best master clock algorithm.

8. The method according to claim 5, wherein the updating comprises maintaining a local table with the association between the time domain information and the PDU session.

9. The method according to claim 5, wherein the time protocol packet is a generic precision time protocol packet or a precision time protocol packet.

10. An apparatus, comprising:
at least one processor; and
at least one memory comprising computer program code,
the at least one memory and computer program code are configured, with the at least one processor, to cause the apparatus at least to:
receive time domain information for a protocol data unit (PDU) session,
update local information associating the time domain information and a user equipment or the PDU session based on one or more parameters related to the user equipment, the one or more parameters comprising information relating to one or more of a mobility event, a location, or a traffic inspection,
receive a time protocol packet,
determine whether to send the time protocol packet to the user equipment for a given PDU session based on the received time domain information, and based on the determination, send the time protocol packet to the user equipment for the given PDU session or performing other forwarding action to the time protocol packet.

11. The apparatus according to claim 10, wherein the time protocol packet is a generic precision time protocol packet or a precision time protocol packet.

12. The apparatus according to claim 10, wherein the time protocol packet comprises time information related to a clock domain number.

13. The apparatus according to claim 10, wherein the updating comprises maintaining a local table with an association between the time domain information and the PDU session.

* * * * *